US008848978B2

(12) United States Patent
Yankun et al.

(10) Patent No.: US 8,848,978 B2
(45) Date of Patent: Sep. 30, 2014

(54) FAST OBSTACLE DETECTION

(75) Inventors: Zhang Yankun, Shanghai (CN); Hong Chuyang, Shanghai (CN); Norman Weyrich, Shanghai (CN)

(73) Assignee: Harman International (China) Holdings Co., Ltd., Shanghai (CN)

( * ) Notice: Subject to any disclaimer, the term of this patent is extended or adjusted under 35 U.S.C. 154(b) by 339 days.

(21) Appl. No.: 13/234,499

(22) Filed: Sep. 16, 2011

(65) Prior Publication Data
US 2013/0070095 A1  Mar. 21, 2013

(51) Int. Cl.
*G06T 1/00* (2006.01)
*G06K 9/00* (2006.01)
*G06T 7/20* (2006.01)

(52) U.S. Cl.
CPC ... *G06K 9/00805* (2013.01); *G06T 2207/10016* (2013.01); *G06T 2207/20224* (2013.01); *G06T 2207/20144* (2013.01); *G06T 2207/30261* (2013.01); *G06T 7/2053* (2013.01)
USPC ........................................................ 382/103

(58) Field of Classification Search
None
See application file for complete search history.

(56) References Cited

U.S. PATENT DOCUMENTS

| | | | | |
|---|---|---|---|---|
| 6,819,778 B2 * | 11/2004 | Kamei | ........................... | 382/103 |
| 7,551,067 B2 * | 6/2009 | Otsuka et al. | ................. | 340/436 |
| 7,557,691 B2 * | 7/2009 | Iwama | ........................... | 340/435 |
| 2008/0230297 A1 * | 9/2008 | Lee et al. | ...................... | 180/271 |
| 2009/0021609 A1 * | 1/2009 | Luo et al. | ...................... | 348/241 |
| 2010/0085427 A1 * | 4/2010 | Cheng et al. | .................. | 348/118 |
| 2010/0315505 A1 * | 12/2010 | Michalke et al. | ............. | 348/118 |
| 2011/0142283 A1 * | 6/2011 | Huang et al. | .................. | 382/103 |
| 2011/0268342 A1 * | 11/2011 | Lee et al. | ...................... | 382/133 |

OTHER PUBLICATIONS

"A Real-Time Rear View Camera Based Obstacle Detection", Guanglin Ma, Manoj Dwivedi, Ran Li, Chong Sun and Anton Kummert, Proceddings of the 12th International IEEE Conference on Intelligent Transportation Systems, Oct. 3-7, 2009, pp. 408-413.*
"GOLD: A Parallel Real-Time Stereo Vision System for Generic Obstacle and Lane Detection", Massimo Bertozzi, and Alberto Broggi, IEEE Transactions on Image Processing, vol. 7, No. 1, Jan. 1998, pp. 62-81.*
"Stereo Inverse Perspective Mapping: Theory and Applications", Massimo Bertozzi, Alberto Broggi, Alessandra Fascioli, Image and Vision Computing, vol. 16 (1998), pp. 585-590.*

(Continued)

*Primary Examiner* — Sath V Perungavoor
*Assistant Examiner* — Janese Duley
(74) *Attorney, Agent, or Firm* — Alleman Hall McCoy Russell & Tuttle LLP

(57) ABSTRACT

Systems and methods for detecting obstacles using a single camera positioned on an apparatus in motion over an area of motion, or stationary over a moving area of motion. In an example method, a video stream of images is captured of the area of motion. The images in the video stream may be corrected for lens distortion prior to further processing. An Nth image frame is selected from a sequence of N images in the video stream. A set of N−1 difference images is calculated by subtracting each of the N−1 previous images from the Nth image. The N−1 difference images are added to one another to generate a combined difference image. A perspective transformation is performed on the combined difference image to generate a transformed image. The transformed image is analyzed to detect edges of obstacles in the transformed image. A signal indicating detection of an obstacle in the area of motion may then be generated.

23 Claims, 6 Drawing Sheets

(56) References Cited

OTHER PUBLICATIONS

"A New Approach for In-Vehicle Camera Obstacle Detection by Ground Movement Compensation", Changhui Yang, Hitoshi Hongo, and Shinichi Tanimoto, Intelligent Transportation System Conference, Oct. 12-15, 2008, pp. 151-156.*

Lin et Al, Construction of Fisheye Lens Inverse Perspective Mapping Model and Its Applications of Obstacle Detection, Jun. 15, 2010, vol. 2010, Article ID 296598, Journal on Advnaces in Signal Processing, 23 pages.*

Yankun, Zhang et al., "A Single Camera Based Rear Obstacle Detection System", 2011 IEEE Intelligent Vehicles Symposium, Baden-Baden, Germany, Jun. 2011, 6 pages.

European Patent Office, Extended European search report of EP12184629, Germany, May 23, 2014, 6 pages.

* cited by examiner

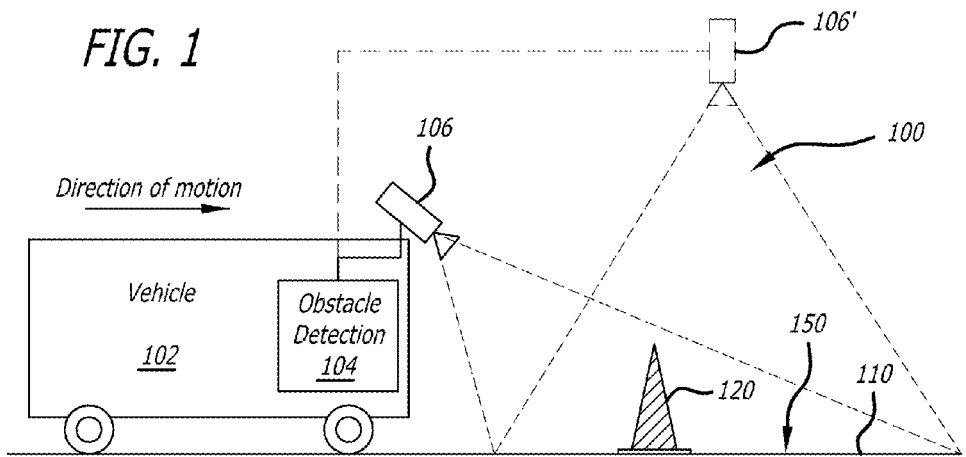
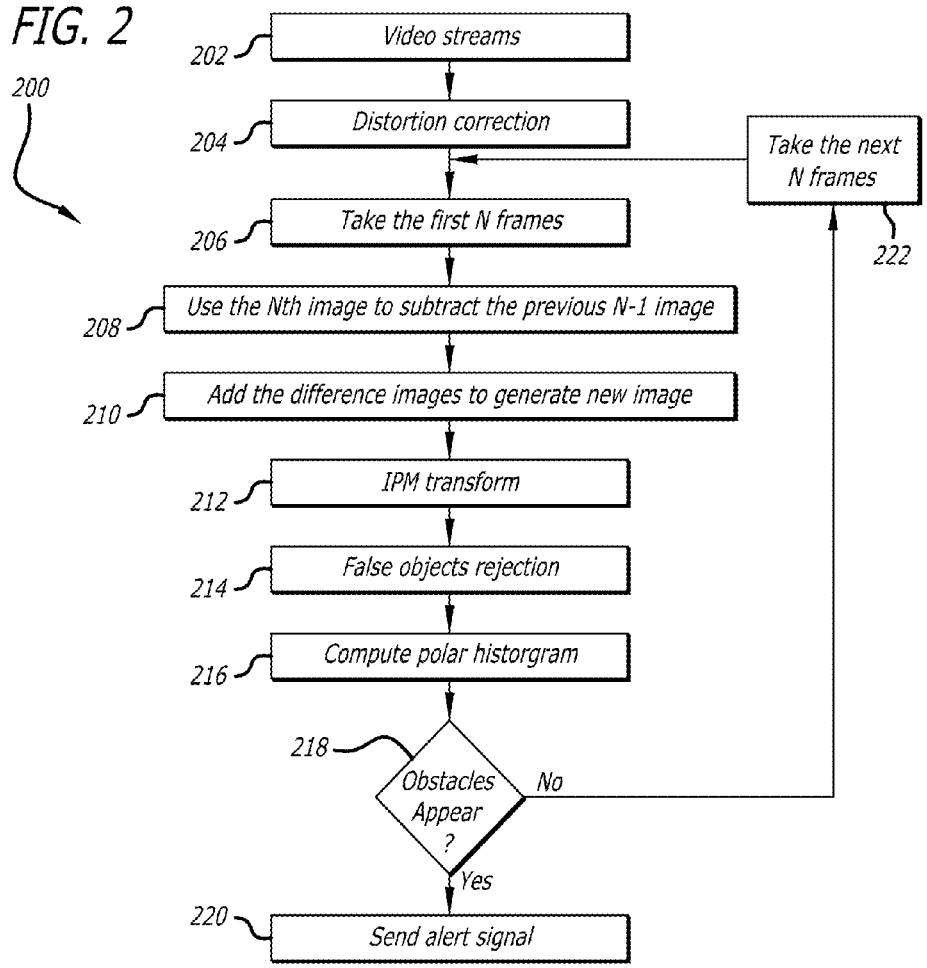

FAST OBSTACLE DETECTION

BACKGROUND

1. Field of the Invention

The invention relates to imaging systems in environments having moving structures, and more particularly, to imaging systems and methods for detecting obstacles.

2. Related Art

Imaging systems are used in moving structures such as vehicles and motorized machines that involve navigation (such as robotic navigation or a conveying mechanism) to detect obstacles that may obstruct the desired motion. Such imaging systems typically use one or more cameras aimed at the path of motion and an image processing system that analyzes the captured images to detect obstacles. When an obstacle is detected, an alarm or other suitable notification may be communicated to allow for avoidance of the obstacle. Obstacle detection systems operate by detecting patterns in the image that are indicative of obstacles. Obstacle detection may be difficult where a structure is moving and suitable results often require the use of hardware and software equipment that may make obstacle detection too costly in the desired application.

One example of an obstacle detection system uses a stereo camera arrangement (a right camera and a left camera) to record images. The images from the cameras are processed using stereo inverse perspective mapping (IPM) to produce a difference image representing the difference between the left and right image. Stereo IPM used in an application for a vehicle may effectively filter out the road texture, road markings, and shadows that typically appear as planar objects on the road surface since images are captured synchronously by the left camera and the right camera. A binary image is obtained by performing some filter and labeling on the difference image. The binary image may contain some blobs, which may or may not be reliable obstacle objects. A polar histogram is computed for each blob and the peaks are analyzed. The strong peaks of the polar histogram may be interpreted as identifying obstacles. Although effective, stereo IPM requires the use of two cameras, which increases costs in an implementation. As a practical matter, applications that use stereo IPM obstacle detection must also factor in the need for space and proper placement of a second camera.

Another example detection system uses one camera in a moving car and also adopts an IPM image (top view). The monocular camera obtains one frame at any given time T and captures two frames between some time intervals to obtain two images that may be used to produce the IPM difference image. Because of vehicle movement, planar objects on the road surface, such as text painted on the road, road markers and shadows, will produce false positives. In order to reject such false positives, the monocular camera system identifies landmarks (such as lane marks) or objects representing prominent road texture in the road environment and uses these objects to compute car movement used to register two images. In another example of a monocular camera based obstacle detection system, optical flow is used to compute the motion parameters of the vehicles.

The monocular camera obstacle detection systems are able to detect obstacles using only one camera. However, such systems typically need to compute vehicle motion and motion parameters in order to register images. The added computation may be sufficiently complex to slow the system down making it difficult to detect obstacles in an effective timeframe.

A need exists for an obstacle detection system that does not require more than one camera and does not require computation of vehicle motion parameters.

SUMMARY

In view of the above, systems and methods are provided for detecting obstacles using a single camera positioned on an apparatus in motion over an area of motion, or stationary over a moving area of motion. In an example implementation, a video stream of images is captured of the area of motion. The images in the video stream may be corrected for lens distortion prior to further processing. An Nth image frame is selected from a sequence of N images in the video stream. A set of N−1 difference images is calculated by subtracting each of the N−1 previous images from the Nth image. The N−1 difference images are added to one another to generate a combined difference image. An inverse perspective transformation is performed on the combined difference image to generate a transformed image. The transformed image is analyzed to detect edges of obstacles in the transformed image. A signal indicating detection of an obstacle in the area of motion may then be generated.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The description below may be better understood by referring to the following figures. The components in the figures are not necessarily to scale, emphasis instead being placed upon illustrating the principles of the invention. In the figures, like reference numerals designate corresponding parts throughout the different views.

FIG. 1 is a block diagram of an example obstacle detection system.

FIG. 2 is a flowchart illustrating operation of an example method for detecting obstacles.

DETAILED DESCRIPTION

Figure 3A:
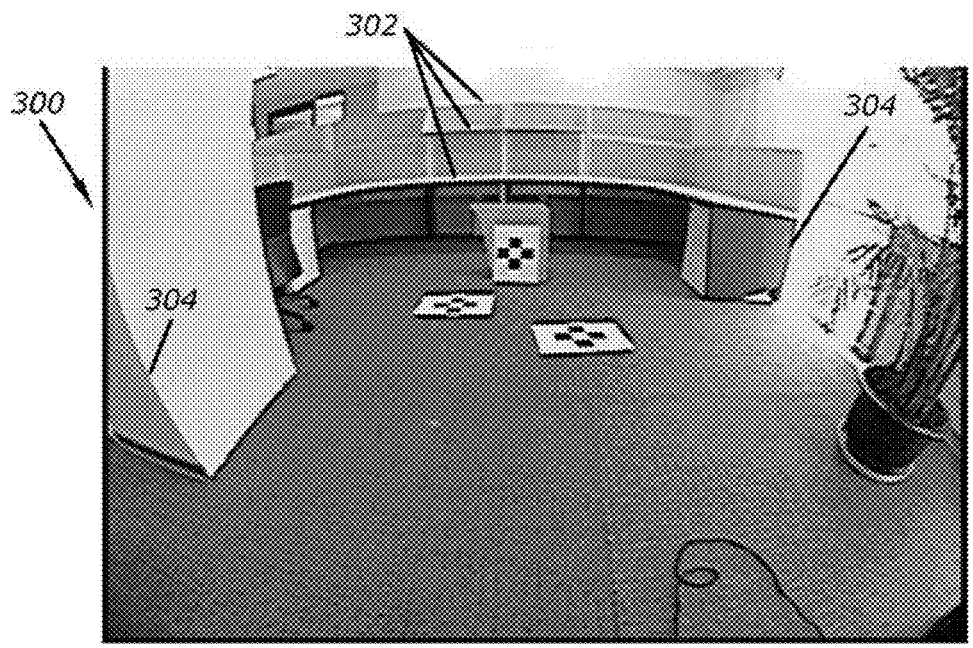
FIGS. 3A-3B are schematic representations of images illustrating operation of a distortion correction.

FIG. 1 is a block diagram of an example obstacle detection system 100 using a single camera 106. The obstacle detection system 100 in FIG. 1 is implemented in a vehicle 102 moving in the indicated direction of motion over a road surface 110. The camera 106 is positioned on the vehicle 102 so as to collect video images of an area 150 before the vehicle 102 moves over the area 150. The vehicle 102 includes an obstacle detection function 104 configured to receive image data from the camera 106 and to process the image data to determine if an obstacle has been placed on the area 150. FIG. 1 shows the example obstacle detection system 100 operating on a vehicle 102; however, an example obstacle detection system 100 may be implemented in any type of structure in which it is desired to detect obstacles in an area over which the structure is moving.

The obstacle detection function 104 is configured to process the video data from the single camera 106 to determine if an obstacle is present in the area of the vehicle motion without requiring the calculation of any vehicle motion parameters. In one example described further below, a series of difference images is generated from a sequence of N frames of video image data. The difference images are added to form a combined image, which is then processed by performing an inverse perspective transformation on the combined image. In an inverse perspective transformation, an image is processed to approximate the view from a different perspective. In the examples described below, the perspective transformation is performed to generate an image from an overhead view of the area of motion as shown by camera 106' in FIG. 1. The transformed difference image is then analyzed using a polar histogram, for example, from which obstacles may be detected.

If an obstacle is detected, the obstacle detection system 106 may signal that an obstacle was detected. The signal indicating detection of an obstacle may be communicated to an appropriate function configured to take a desired action. For example, the indication of an obstacle may be used to automatically (that is, without user action) bring the vehicle to a stop. The indication of an obstacle may also be annunciated to the user or driver, with or without the display of the image of the area captured by the camera 106. The detection of an obstacle may be used in any manner in accordance with the specific application in which the obstacle detection system 100 is used.

FIG. 2 is a flowchart illustrating operation of an example method 200 for detecting obstacles. The example method 200 illustrated in FIG. 2 may be performed using an example of the obstacle detection system 100 shown in FIG. 1. The method 200 of obstacle detection illustrated in FIG. 2 may be performed in a vehicle 102 moving in a direction of motion into an area of motion. As the vehicle 102 moves, the camera 106 records video streams as indicated at step 202. The video streams, which may be stored as sequences of image frames, may include some distortion due to the camera lens. The video streams collected in step 202 may be recorded in, or converted to, grayscale images for processing by the method 200. The video streams may also be recorded as color images and processed as color images without converting to grayscale. At step 204, the images in the video stream are corrected for distortion. At step 206, the first N frames of a video stream are selected for processing. It is noted that the "first" N frames may be the most recent N frames collected, which would make them the "last" N frames in time. Alternatively, the "first" N frames may be the first sequence of N frames stored in a memory space containing multiple sequences of N frames, which would make the "first" N frames the first frames collected in time.

The value of 'N' referenced in FIG. 2 may depend on the application in which the obstacle detection method 200 is being implemented. In some example implementations, a value of N between about 2 and 10 has been found to be suitable. The value of N may depend on factors such as the image resolution, the size of the image; and whether the method 200 is being used in a vehicle traveling relatively fast such as on a highway, or slow such as in reverse while maneuvering to park. If obstacle detection is being performed in a moving vehicle, and the speed of the vehicle is relatively fast, the value of N should be relatively small, such as for example, 2 or 3. If however the speed of the vehicle is relatively slow, the value of N may be relatively large, such as for example, 4~10.

At step 208, a set of N−1 difference images is generated by subtracting each of the N−1 image frames from the Nth image frame. At step 210, the N−1 difference images are summed to generate a combined image. At step 212, a perspective transformation is performed on the combined image. The perspective transformation may be performed using an inverse perspective mapping ("IPM") transform algorithm. The perspective transformation of the combined image modifies the image in a manner that highlights anomalies or aspects of the image that may be attributed to objects projecting upward from the surface of the area of motion 110. For example, an object that projects perpendicular to the surface of the area of motion 110 may appear on the transformed image as straight lines extending through a projection point of the camera. An example of an IPM algorithm is described in Chin-Teng Lin, Tzu-Kuei Shen, and Yu-Wen Shou, "Construction of Fisheye Lens Inverse Perspective Mapping Model and Its Applications of Obstacle Detection", EURASIP Journal on Advances in Signal Processing, Volume 2010 (2010), Article ID 296598, which is incorporated by reference herein.

At step 214, the transformed image is analyzed for indications of objects that do not belong on the surface of the area of motion 110. The analysis in step 214 may involve identifying elongation lines extending through the projection point of the camera as lines indicating the edges of objects that may be obstacles on the area of motion. The transformed image may include lines from shadows, strips, lane markers, and other objects that belong on the area of motion, or at least do not represent obstacles for the vehicle. Such lines, which are caused by objects that are not obstacles do not extend through the projection point of the camera and are therefore rejected from consideration as edges of objects.

At step 216, a polar histogram is computed to segment the obstacle objects. Typically, polar histograms are performed on binary images. The polar histogram in the example implementation described with reference to FIG. 2 is performed on a grayscale image. There is no need to compare image intensities to any threshold to generate a binary image. The polar histogram is computed using each straight line originating from the projection point that is identified in the transformed image. In one example implementation, the intensity values of the pixels lying on each line originating from the projection point are added. The values of the polar histogram are then normalized and low pass filtered to reduce the influence of noise.

The resulting histogram is then analyzed to identify obstacles at decision block 218. The peaks in the histogram are considered to correspond to obstacles. The obstacles may be identified in the histogram by applying some rules. An example of a polar histogram analysis to identify obstacles is described below with reference to FIGS. 6A and 6B. If an obstacle is identified at decision block 218, a signal indicating that an obstacle has been detected in the area of motion at step 220. Some applications may perform more than sending an alert signal. For example, the signal indicating an obstacle has been detected may be used to trigger an automatic stop function in which a vehicle moving into the area of motion is brought to a stop. If no obstacle was detected at decision block 218, the process may be repeated for another N frames, which may be selected at step 222. The next N frames may be from video images received after the N frames just processed. The next N frames may also be frames stored in a memory storage area with a larger block of video image data.

The example method 200 illustrated by the flowchart in FIG. 2 may be performed continuously as long as the vehicle 102 is moving into the area of motion 110.

Figure 3B:
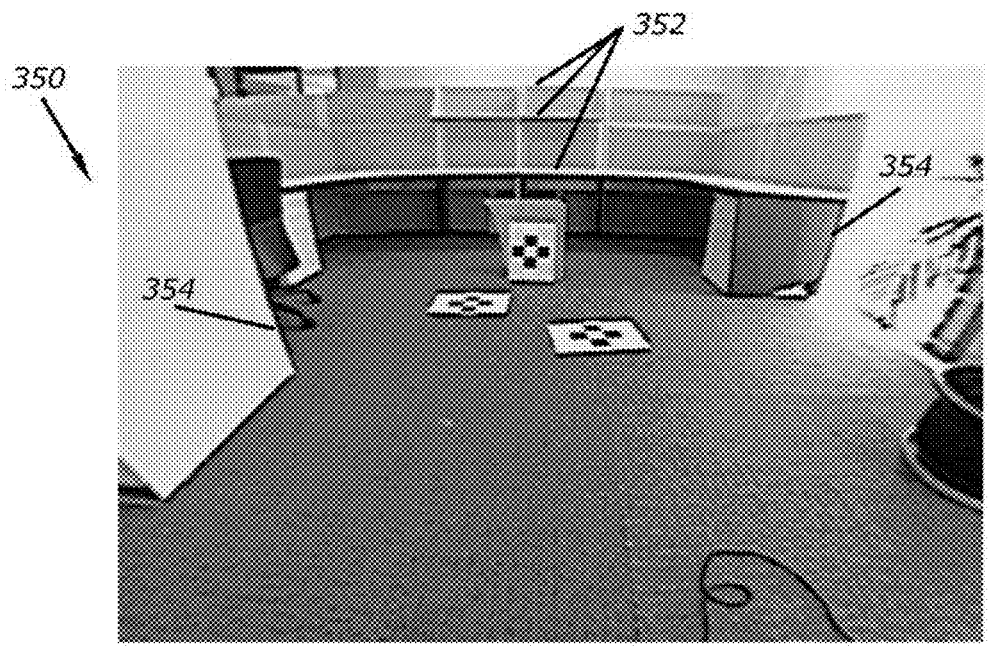

As described above with reference to FIG. 2, an obstacle detection function may be performed on a video image that may be distorted due to lens distortion. The distortion in the video image may be corrected using the lens distortion factors. FIGS. 3A-3B are schematic representations of images illustrating an example operation of a distortion correction. FIG. 3A illustrates an image 300 that has not been corrected for lens distortion. The image 300 depicts horizontal lines (at 302) and vertical lines (at 304) on structures as curved lines. The curved lines may affect the accuracy of obstacle detection. FIG. 3B shows a distortion corrected image 350 showing straighter, or less curved, horizontal lines (at 352) and vertical lines (at 354).

Distortion correction modifies an image by removing the effect of the lens from the image. This type of correction operates on how a scene in world coordinate space appears in the image in camera coordinate space. Distortion correction is performed in the translation of the scene to the image coordinate space. The following describes distortion correction for a pinhole camera model used to project three-dimensional points in a world coordinate space into an image plane in a pixel-based image coordinate space using perspective transformation. It is assumed in the following description that:

(X, Y, Z) are coordinates of a three dimensional point in the world coordinate space, (x, y, z) are coordinates of a three dimensional point in the camera coordinate space, (u, v) are coordinates of a point projection on an image in pixels (image coordinates), $(c_x, c_y)$ is a principal point (that is usually at the image center), $f_x, f_y$ are focal lengths expressed in pixel-related units, Matrix R is a rotation matrix, and Matrix t is a translation matrix.

The R and t matrices include parameters that describe the camera motion around a static scene, or, rigid motion of an object in front of still camera. Matrices R and t translate coordinates of a point (X, Y, Z) to a camera coordinate system that is fixed with respect to the camera. The translation is represented below as (x, y, z) in Equation 1.

$$(xyz) = R \times (XYZ) + t \quad \text{Equation (1)}$$

The point (x, y, z) in a camera coordinate system may be projected on an image plane according to an image coordinate system as a pixel (u, v) as shown in Equations 2 and 3 without correcting for distortion:

$$x' = x/z \quad \text{Equation (2a)}$$

$$y' = y/z \quad \text{Equation (2b)}$$

$$u = f_x x' + c_x \quad \text{Equation (3a)}$$

$$v = f_y y' + c_y \quad \text{Equation (3b)}$$

The above calculations may incorporate distortion correction as follows. Real lenses usually have some distortion having two major components: radial distortion and slight tangential distortion. The above model for perspective transformation may be extended as:

$$(xyz) = R = (XYZ) + t \quad \text{Equation (4)}$$

$$x' = x/z \quad \text{Equation (5a)}$$

$$y' = y/z \quad \text{Equation (5b)}$$

$$x''(x'') = x'(x')(1 + k_1 r'^2 + k_2 r'^4) + 2p_1 x'(x') \\ y'(x') + p_2(r'^2 + 2x'(x')^2) \quad \text{Equation (6a)}$$

$$y''(y'') = y'(y')(1 + k_1 r'^2 + k_2 r'^4) + p_1(r'^2 + 2y'(y')^2) + 2p_2 x'(y')y'(y') \quad \text{Equation (6b)}$$

$$u = f_x x''(x'') + c_x \quad \text{Equation (7a)}$$

$$v = f_y y''(y'') + c_y \quad \text{Equation (7b)}$$

where:

$r^2 = x'^2 + y'^2$ $k_1, k_2$ are radial distortion coefficients, and $p_1, p_2$ are tangential distortion coefficients.

In examples described here, it is assumed that a desired accuracy of correction may be obtained without needing to use higher-order coefficients. It is noted that the distortion coefficients do not depend on the scene viewed and remain the same regardless of the captured image resolution. The distortion coefficients may be stored and used with other intrinsic parameters such as the focal lengths $(f_x, f_y)$, and principal points $(c_x, c_y)$ for fixed focal lengths. If a zoom lens is used, the intrinsic parameters may be stored as a function of focal lengths, or preset for specific focal lengths.

The rotation and translation matrices (R & t) are extrinsic parameters since the R and t matrices are used to describe camera motion around a static scene, or the motion of an object in front of a still camera. In an example of one implementation, intrinsic and extrinsic camera parameters may be estimated from several views of a known calibration pattern, every view being described by several 3D-2D point correspondences. One example of a calibration pattern that may be used is a white-black chess board of a known size and square dimensions placed in a space in which the world space coordinates are known. For example, a white-black chess board on a flat surface (such as for example, a sheet of A3 paper) affixed on a flat board, each square on the chess board having a square size of 22 mm×22 mm. The correspondence between the 3D points, for example, at the square corners, and the 2D image points may be determined and re-used in converting from the world space coordinates to the camera coordinates, and then to the image coordinates (in pixels) as described above with reference to Equations 4-7.

The correction of distortion in the images to be processed may improve the ability of the system to detect obstacles using inverse perspective transformation. The images may be corrected by performing the correction on each frame as the video stream is input by the obstacle detection function 104. In the example method described above with reference to FIG. 2, the corrected frames are then used to calculate difference images as well as a combined image. Difference images are image frames obtained by taking the difference between the previous N frames and the Nth frame. The difference images are summed to generate a combined image. The combined image is then processed using Inverse Perspective Mapping ("IPM").

Figure 4A:
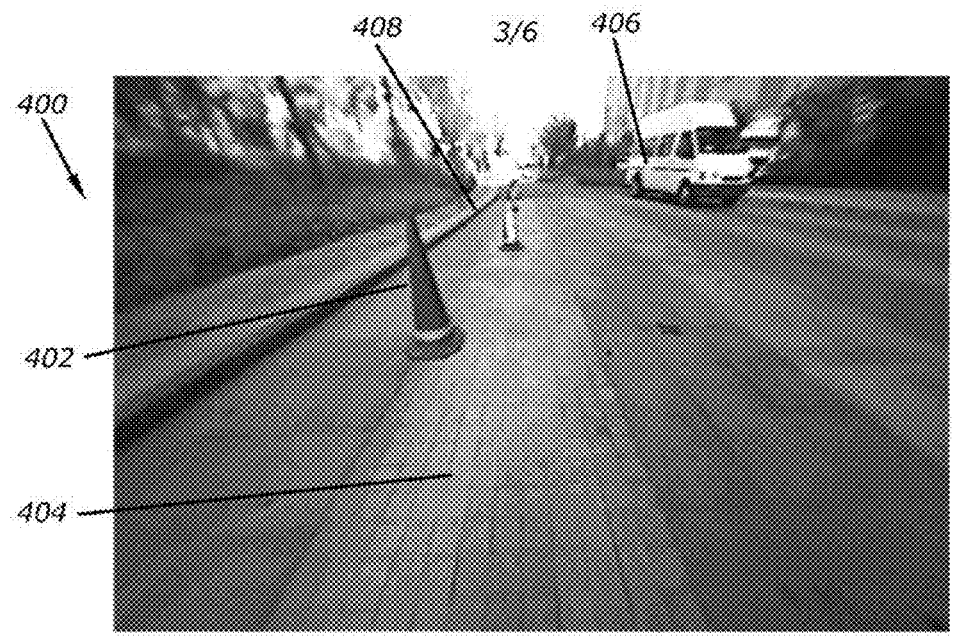
FIGS. 4A-4C are schematic representations of images illustrating an inverse perspective transformation.
Figure 4B:
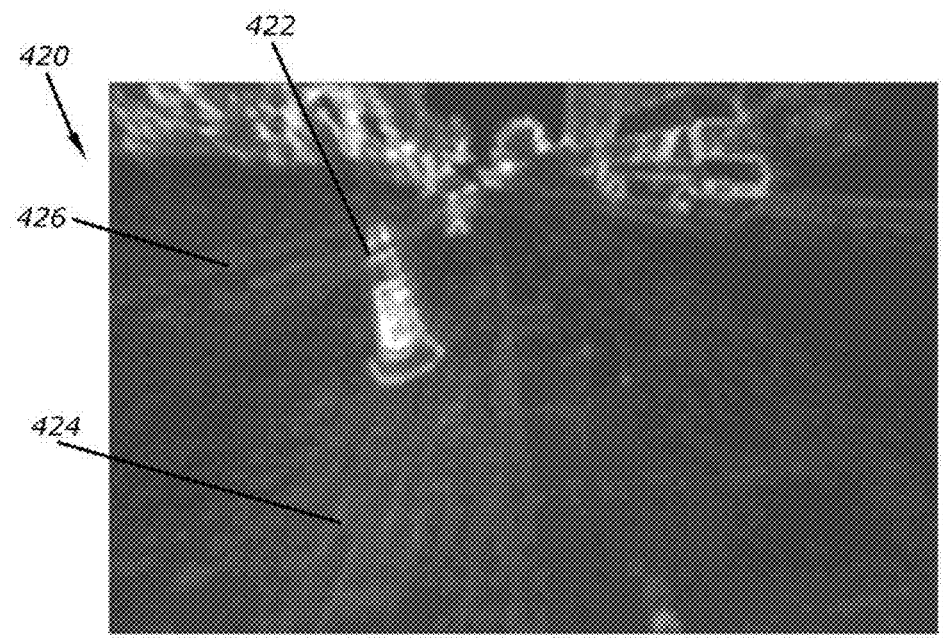
Figure 4C:
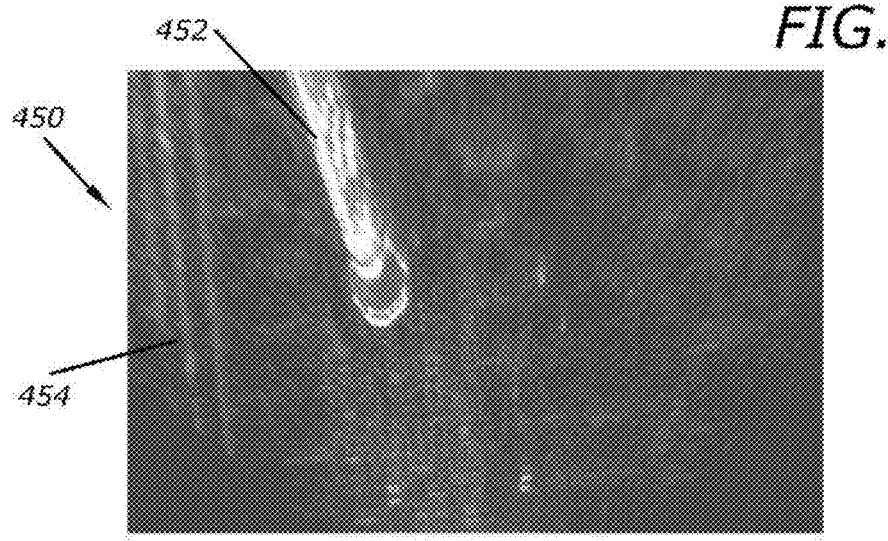

FIGS. 4A-4C are schematic representations of images illustrating inverse perspective transformation on an example distortion corrected image. FIG. 4A is a distortion corrected image 400 prior to processing in order to generate a difference and combined image. The corrected image 400 in FIG. 4A may be the Nth image in a sequence of N images selected for performing obstacle detection. The corrected image 400 may also be the first of the sequence of N images. In the examples described here, it is assumed that the corrected image 400 is the Nth image in the sequence. The corrected image 400 in FIG. 4A shows a road surface having an obstacle 402, a road surface pattern 404, a vehicle 406, and a curb 408. The objects on the road shown in FIG. 4A may cause visible patterns to show after difference images have been combined and processed by perspective transformation. In example obstacle detection function implementations, objects that are not likely to be obstacles are either substantially diminished in the transformed image, or rejected in the analysis of the transformed image.

FIG. 4B is an example of a combined image 420 generated by calculating difference images using the previous N−1 image. For N=5, the previous four images (N−1, N−2, N−3, N−4) are each subtracted from the fifth image to obtain four (N−1) difference images. Image frames N, N−1, N−2, N−3, and N−4 may be defined to be matrices |N|, |N−1|, |N−2|, |N−3|, and |N−4| containing grayscale intensities at corresponding pixel locations where N is the selected image frame for analysis. The calculation of difference images may then proceed as follows:

Difference Image Δ(N−1)=|N|−|N−1|  Equation (8a)

Difference Image Δ(N−2)=|N|−|N−2|  Equation (8b)

Difference Image Δ(N−3)=|N|−|N−3|  Equation (8c)

Difference Image Δ(N−4)=|N|−|N−4|  Equation (8d)

The difference image calculations in Equation 8 are performed by subtracting intensities in one frame (|N−1|, for example) from the intensities at the corresponding pixel locations in frame |N|. The difference images calculated in Equation 8 are then summed to generate a combined image as follows:

Combined Image |C|=Δ(N−1)+Δ(N−2)+Δ(N−3)+Δ(N−4)  Equation (9)

The summation of the difference images is performed by matrix addition of the intensities at the corresponding pixel locations in each difference image frame. An example of a combined image 420 is shown in FIG. 4B for the image 400 shown in FIG. 4A. The combined image 420 in FIG. 4B illustrates the effect that the calculation of the difference images and combined image has on the appearance of the objects in the image 400 in FIG. 4A, which is generally to extract edges of objects that may be potential obstacles. The obstacle 402 in FIG. 4A is shown as an obstacle 422 in FIG. 4B that is slightly blurred along the line of motion. The road surface pattern 404 in FIG. 4A is shown at pattern 424 in FIG. 4B as a more faint representation of the original pattern, which includes lines running along the line of motion. The curb 408 is shown as a faint line at 426 in FIG. 4B. FIG. 4B also shows outlines of other objects, although most of the detail in the image that would not be relevant to a detection of an obstacle has effectively been filtered out.

It is noted that if the first of the N images is selected as the corrected image for obtaining difference images, Equations (8a) et seq and Equation (9) would differ only in that the images following the first image are subtracted from the first image.

The combined image 420 in FIG. 4B may be transformed by perspective transformation, which is performed using IPM. IPM is a well-known technique for mapping images from one perspective to a birds eye, or top, view, and need not be described in more detail. FIG. 4C illustrates an example of a transformed image 450 that may be generated by performing IPM on the combined image 420 in FIG. 4B. As described above, IPM generates a birds eye view (or a top view) of an image that was recorded from a different perspective such as for example an elevated view from an angle. The IPM transformation has the effect of extending the edges of objects that may be obstacles along lines that converge at a projection point. The projection point is a point that represents the focal point of the camera and may not actually appear on the image. The projection point is assumed to be approximately in the center of a line segment that is parallel and equal in length to the edge of the image nearest the camera. The transformed image 450 shows an object image 452 formed by edges that appear to extend toward the projection point. The transformed image 450 also includes lines 454 that represent other objects, such as the road surface patterns 404 in FIG. 4A. The lines 454 that represent the road surface patterns do not appear to extend towards the projection point and are thus distinguishable from the edges that form the object image 452.

Figure 5A:
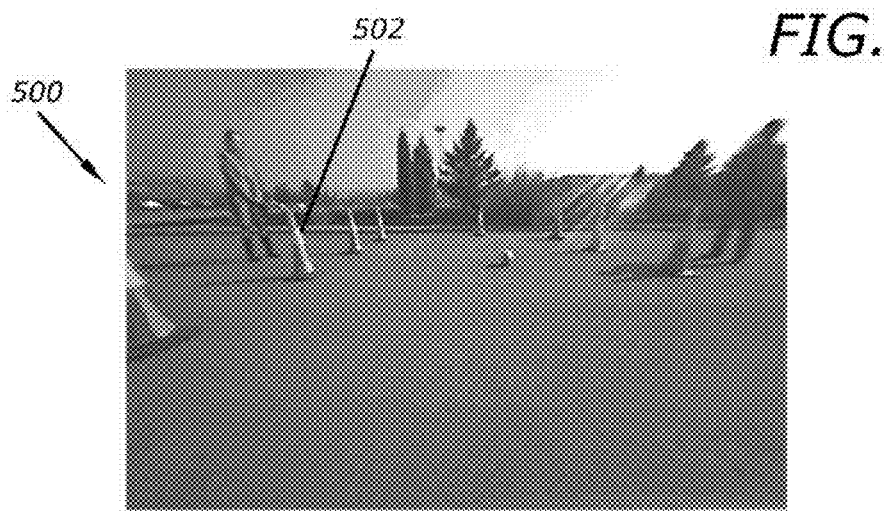
FIGS. 5A-5B are schematic representations of images illustrating obstacle object segmenting of an inverse perspective mapped difference image.
Figure 5B:
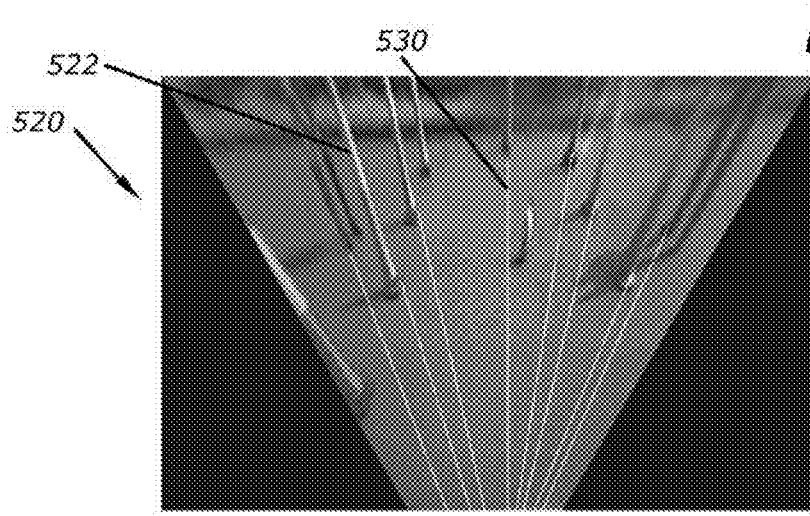

FIGS. 5A-5B are schematic representations of images illustrating object segmenting of an inverse perspective mapped difference image. FIG. 5A shows an original image 500 after distortion correction. The image 500 includes objects 502 placed in an area of motion 504 so that the objects 502 would be deemed obstacles for a vehicle travelling in the area of motion 504. FIG. 5B shows a combined image 520 after perspective transformation using IPM. The combined IPM image 520 shows the original objects 502 from FIG. 5A as IPM objects 522. The edges that form the IPM objects 522 lay on extension lines 530 that extend to converge to a projection point, which is beyond the lower edge of the image. The combined IPM image 520 in FIG. 5B illustrates how lines in the image may be analyzed to distinguish objects that may present an obstacle from objects or patterns that show up in an image as lines but do not present an obstacle. The analysis illustrated in FIG. 5B illustrates an example of an analysis performed, for example, in step 214 in the flowchart in FIG. 2.

Figure 6A:
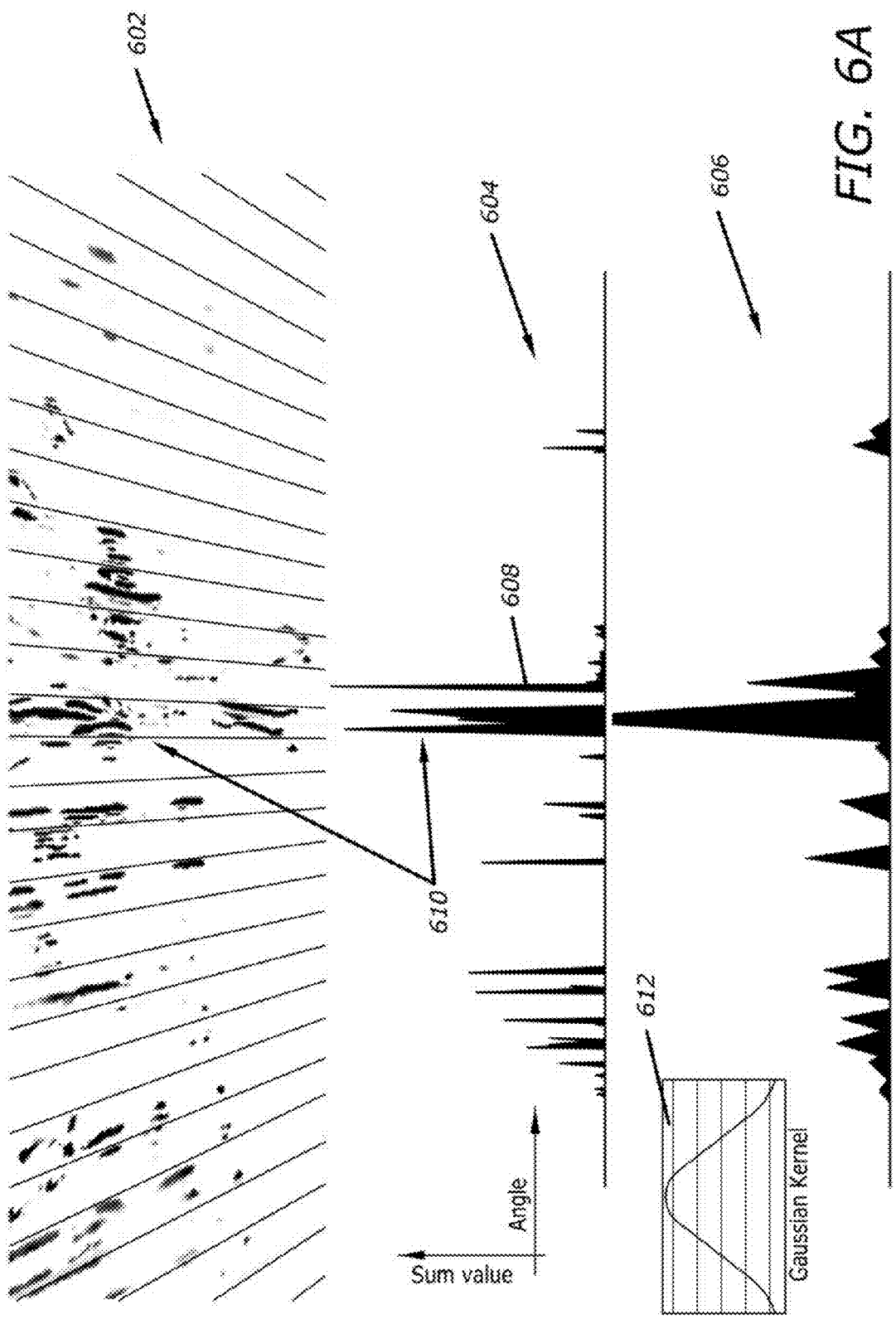
FIGS. 6A-6B illustrate an example analysis of an inverse perspective mapped difference image using a polar histogram.
Figure 6B:
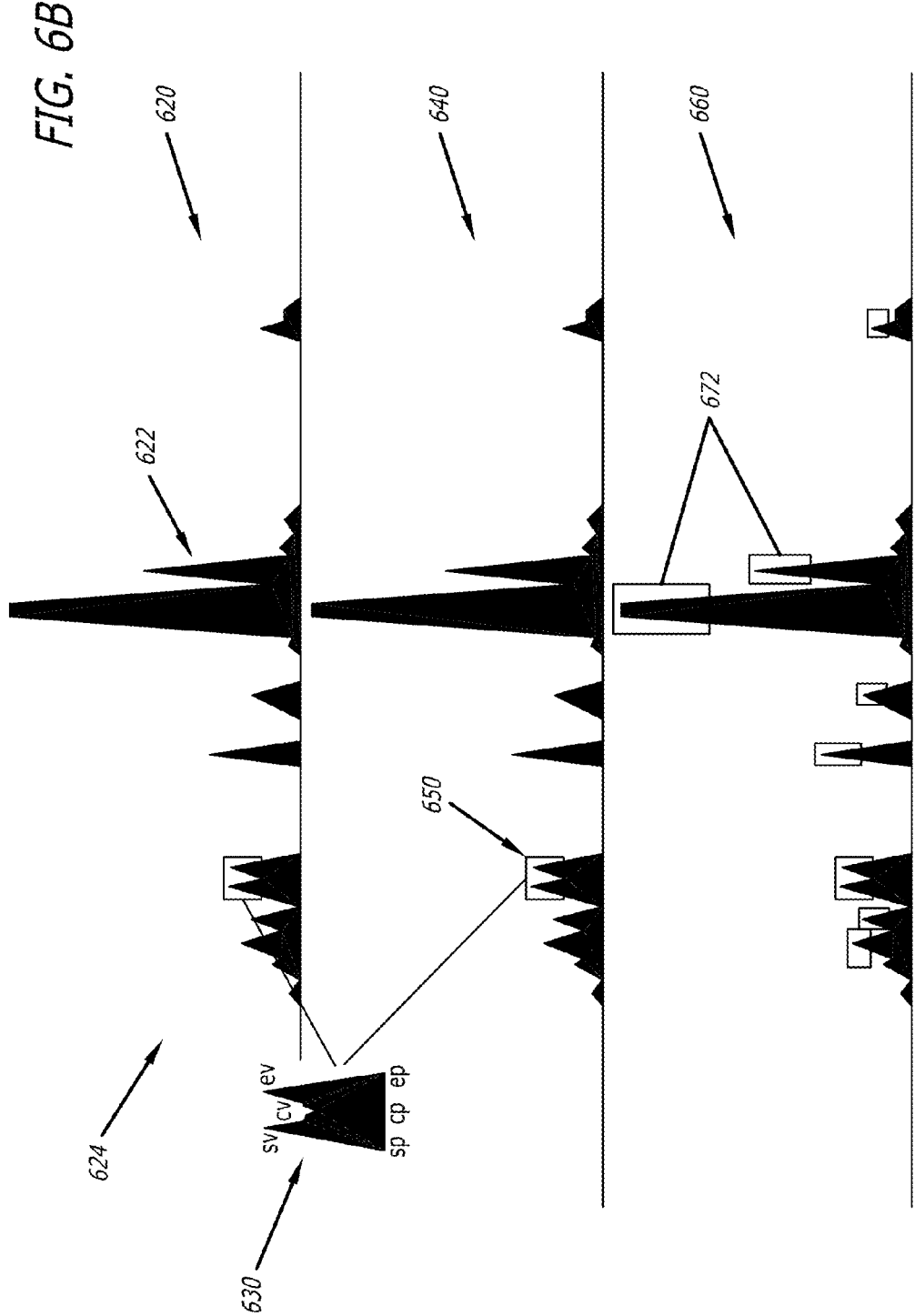

The combined IPM image 520 in FIG. 5B may be further processed by segmentation and analysis using a polar histogram. FIGS. 6A-6B illustrate an example analysis of an inverse perspective mapped combined difference image using a polar histogram. Referring to FIG. 6A, the combined IPM image may be segmented as shown at 602 according to a plurality of lines that converge on a projection point as shown in the combined IPM image 520 in FIG. 5B. The combined IPM image 520 in FIG. 5B shows lines extending from edges identified in the image 520. The plurality of lines used in segmenting the image as shown at 602 may be lines formed through the image at a plurality of angles, which the projection point as a common vertex.

A polar histogram is formed by adding the pixel intensity values of the pixels on lines forming each angle as shown at 604. The polar histogram is a plot of the sum values at each angle as shown at 605. Lines forming edges of objects in the combined IPM image form peaks on the polar histogram at the angles of the respective lines as shown at 608. The height of the peaks correlates roughly with the sharpness and the length of the edge indicated by the line extending along the angle of the edge of what may be an object. The values plotted in the polar histogram may be normalized and the polar histogram may be filtered as shown at 606 using, for example, a low pass Gaussian filter 612 to reduce the effect of noise. The polar histogram at 606 may then be analyzed further to more precisely identify obstacles.

As shown in FIG. 6B, the polar histogram may be analyzed for identification of peaks and valleys that are near each other. Based on the processing of the images as described above with reference to FIGS. 2-5B, an analysis of the polar histogram may result in the detection of obstacles indicated by peaks and valleys that are positioned according to selected criteria. The criteria may be selected by determining, for example, how close two peaks in the polar histogram should be to each other to constitute edges of an object, and how much of a minimum peak there should be between the two peaks. That is, if two peaks are near each other, they are more likely edges of an object that may be an obstacle. As the distance between the peaks increases, it becomes more likely that the peaks do not represent edges of the same object.

Referring to FIG. 6B, the peaks in the polar histogram may be identified as local maximums 622 and local minimums 624 where local minimums 624 are the minimum values in valleys. Valleys may be defined to be the spaces between peaks that are in substantial proximity to one another. The local maximums 622 and minimums 624 may then be analyzed according to their positions relative to one another. An example is illustrated at 630 in FIG. 6B, which is a graph of a scan of the polar histogram and the components identified during the scan. As shown at 630, the polar histogram may be scanned at 640 to identify a start peak sp. The difference in angles between the start peak sp and a previous minimum value may be identified as a start rise sv (in FIG. 6B) to the start peak sv. The scan of the polar histogram may continue past the identified start peak sp to a next local minimum, which may be identified as a center peak cp. The scan may continue past the center peak cp to an end peak ep. The distance in angles between the start peak sp and end peak ep may be defined as a center valley cv. The scan may then continue to a next minimum past the end peak ep to determine an end rise ev as the difference in angles between the end peak ep and next minimum.

Once a set of peaks and angle differences between the peaks is determined for sv, sp, cv, cp, ep, ev, as defined above, a condition may be applied to either eliminate the identified peaks as edges of an obstacle, or to indicate that an obstacle has been detected. In one example, the following condition is applied:

If sv+(ev−sv)(cp−sp)/(ep−sp)>2cv, then
    remove local peak sp and the minimum value used to determine sv as candidate obstacle edges;
    set sp=ep;
    set sv=angle distance between cp and ep;
    scan for new cv, ep, and ev, and retest if found;
    if cv, ep, and ev are not found, reset sp, sv, cv, ep, and ev and continue scan of polar histogram.
Otherwise, identify peaks sp and ep as obstacle edges.
Continue scan of polar histogram.

Candidate peaks may be identified as having met the above condition where sets of peak pairs as shown at 650 may be identified as strong candidates for representing obstacles. Once the polar histogram is scanned, the peaks identified as candidate peaks during the scan may be localized as shown at 660 in FIG. 6B to identify the obstacle edges. In localizing the peaks, further analysis may be performed on the peaks in the polar histogram to more precisely identify obstacle edges. For example, the peaks at 672 may have peak magnitudes that are not close enough to each other to be edges of the same obstacle. Other types of analysis may be performed on the polar histogram to make the obstacle detection more accurate and precise.

It is noted that the above description assumes that the camera is in a vehicle in motion. Those of ordinary skill in the art will appreciate that the above-described systems and methods are not limited to use in vehicles, or in moving structures. Examples of obstacle detection systems as described above may be implemented in stationary structures over a moving surface, and in any application where obstacle detection may be used.

It will be understood, and is appreciated by persons skilled in the art, that one or more processes, sub-processes, or process steps described in connection with FIGS. 1-6 may be performed by hardware and/or software. If the process is performed by software, the software may reside in software memory (not shown) in a suitable electronic processing component or system such as, one or more of the functional components or modules schematically depicted in FIGS. 1-6. The software in software memory may include an ordered listing of executable instructions for implementing logical functions (that is, "logic" that may be implemented either in digital form such as digital circuitry or source code or in analog form such as analog circuitry or an analog source such an analog electrical, sound or video signal), and may selectively be embodied in any computer-readable medium for use by or in connection with an instruction execution system, apparatus, or device, such as a computer-based system, processor-containing system, or other system that may selectively fetch the instructions from the instruction execution system, apparatus, or device and execute the instructions. In the context of this disclosure, a "computer-readable medium" is any means that may contain, store or communicate the program for use by or in connection with the instruction execution system, apparatus, or device. The computer readable medium may selectively be, for example, but is not limited to, an electronic, magnetic, optical, electromagnetic, infrared, or semiconductor system, apparatus or device. More specific examples, but nonetheless a non-exhaustive list, of computer-readable media would include the following: a portable computer diskette (magnetic), a RAM (electronic), a read-only memory "ROM" (electronic), an erasable programmable read-only memory (EPROM or Flash memory) (electronic) and a portable compact disc read-only memory "CDROM" (optical). Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. A system for detecting an obstacle comprising:
one camera positioned on an apparatus to capture a video stream of images of an area of motion in which the apparatus is moving; and
an obstacle detection function configured to receive the video stream of images, and to process the video stream of images by:
selecting an Nth image frame from a sequence of N images received in the video stream;
determining N−1 difference images by subtracting each of N−1 previous images from the Nth image;
adding the N−1 difference images to generate a combined difference image;
performing a perspective transformation on the combined difference image to generate a transformed image;
further processing the transformed image by segmentation wherein the transformed image is segmented by a plurality of lines extending from a projection point; and
generating a signal indicating detection of an obstacle in the area of motion based on identification of peaks and valleys in segments of the transformed image and a proximity of the peaks and valleys to one another, the peaks and valleys identified as local maximums and local minimums.

2. The system of claim 1 where the apparatus is a vehicle moving over a road surface containing the area of motion.

3. The system of claim 1 where the apparatus is a stationary apparatus as viewed by an observer where the apparatus is positioned over a surface containing the area of motion where the surface is moving relative to the stationary apparatus.

4. The system of claim 1 where a number of image frames N is between 2 and 10.

5. The system of claim 1 where the obstacle detection function is configured to:
correct a lens distortion of the video stream of images before selecting the Nth image frame.

6. The system of claim 1 where the obstacle detection function is configured to perform the perspective transformation using inverse perspective mapping (IPM).

7. The system of claim 1 where the obstacle detection function is configured to analyze the transformed image by identifying edges of objects formed along lines that do not extend to a projection point of the transformed image and rejecting the identified edges of objects from further processing.

8. The system of claim 1 where the obstacle detection function is configured to analyze the transformed image by identifying edges of objects formed along the lines extending to the projection point of the transformed image as being candidates for edges of obstacles.

9. The system of claim 1 where the obstacle detection function is configured to detect an obstacle in the area of motion by:
constructing a polar histogram of the segments of the transformed image;
analyzing the peaks and valleys identified as local maximums and local minimums in the polar histogram according to criteria for peaks belonging to edges of obstacles.

10. The system of claim 9 wherein processing the transformed image by segmentation includes:
segmenting the transformed image according to areas between angles formed by the plurality of lines extending from the projection point;
adding pixel values for pixels that form edge lines of potential object edges along angles of corresponding edge lines; and
plotting the pixel values against the corresponding angles.

11. The system of claim 10 where the obstacle detection function is further configured to identify edges of obstacles by scanning the polar histogram, and to:
identify peaks as local maximums for values at angles having values greater than values at nearby angles;
identify peaks as local minimums for values at angles having values lower than values at nearby angles;
identify peak and angle distances between peaks as:
sp=a starting local maximum;
sv=angle distance between a prior local minimum and sp;
cp=a next local minimum after sp;
ep=a next local maximum after cp;
cv=angle distance between sp and ep;
ev=angle distance between ep and next local minimum after ep;
evaluate sv+(ev−sv)(cp−sp)/(ep−sp)>2cv, to reject sp as a candidate peak;
continue scan for additional candidate peaks;
localize candidate peaks to indicate obstacle detected.

12. A method for detecting an obstacle using a single camera positioned on an apparatus comprising:
capturing a video stream of images of an area of motion in which the apparatus is moving;
selecting an Nth image frame from a sequence of N images received in the video stream;
determining N−1 difference images by subtracting each of the N−1 previous images from the Nth image;
adding the N−1 difference images to generate a combined difference image;
performing a perspective transformation on the combined difference image to generate a transformed image;
segmenting the transformed image into segments based on areas between angles formed by a plurality of lines extending from a common projection point; and
generating a signal indicating detection of an obstacle in the area of motion based on identification of peaks and valleys corresponding to local maximums and local minimums in the segments of the transformed image and a proximity of the peaks and valleys to one another.

13. The method of claim 12 where the apparatus is a vehicle moving over a road surface containing the area of motion.

14. The method of claim 12 where the apparatus is a stationary apparatus as viewed by an observer where the apparatus is positioned over a surface containing the area of motion where the surface is moving relative to the stationary apparatus.

15. The method of claim 12 where a number of image frames N is between 2 and 10.

16. The method of claim 12 further comprising:
correcting a lens distortion of the video stream of images before selecting the Nth image frame.

17. The method of claim 12 where the step of perspective transformation is performed using inverse perspective mapping (IPM).

18. The method of claim 12 where the step of detecting an obstacle in the area of motion includes:
identifying edges of objects formed along lines that do not extend to the common projection point of the transformed image; and
rejecting the identified edges of objects from further processing.

19. The method of claim 12 where the step of detecting an obstacle in the area of motion includes:
identifying edges of objects formed along the lines extending to the projection point of the transformed image as being candidates for edges of obstacles.

20. The method of claim 12 where the step of detecting edges of obstacles includes:
constructing a polar histogram of the segments of the transformed image;
analyzing the peaks and valleys identified as local maximums and local minimums formed in the polar histogram according to criteria for peaks belonging to edges of obstacles, wherein two peaks separated by a smaller distance are identified as edges of a common obstacle and wherein two peaks separated by a larger distance are not identified as edges of the common obstacle.

21. The method of claim 20 where the step of constructing the polar histogram includes:
adding pixel values for pixels lying on each line originating from the common projection point of the transformed image; and
plotting the pixel values against angles corresponding to each line originating from the common projection point of the transformed image to generate the peaks and valleys.

22. The method of claim 21 where the step of analyzing peaks formed in the polar histogram includes:
   identifying peaks as local maximums for values at angles having values greater than values at nearby angles;
   identifying peaks as local minimums values for values at angles having values lower than values at nearby angles;
   identifying peak and angle distances between peaks as:
      sp=a starting local maximum;
      sv=angle distance between a prior local minimum and sp;
      cp=a next local minimum after sp;
      ep=a next local maximum after cp;
      cv=angle distance between sp and ep;
      ev=angle distance between ep and next local minimum after ep;
   evaluate sv+(ev−sv)(cp−sp)/(ep−sp)>2cv, to reject sp as a candidate peak;
   continue scan for additional candidate peaks; and
   localize candidate peaks to indicate obstacle detected.

23. The method of claim 22 where the step of evaluating sv further comprises:
   removing local peak sp and the minimum value used to determine sv as candidate obstacle edges;
   setting sp=ep;
   setting sv=angle distance between cp and ep;
   scanning the polar histogram from cp to identify a new set of cv, ep, and ev; and
   re-evaluating sv+(ev−sv)(cp−sp)/(ep−sp)>2cv.

* * * * *